United States Patent [19]
Gilbert

[11] Patent Number: 5,588,620
[45] Date of Patent: Dec. 31, 1996

[54] RADIAL-FORCE SPOILER SYSTEM

[76] Inventor: Raymond D. Gilbert, 6501 Inwood Dr., Springfield, Va. 22150

[21] Appl. No.: 296,668

[22] Filed: Dec. 1, 1994

Related U.S. Application Data

[63] Continuation-in-part of Ser. No. 935,284, Aug. 26, 1992, Pat. No. 5,445,346, and Ser. No. 158,749, Nov. 26, 1993, Pat. No. 5,458,304.

[51] Int. Cl.$^6$ .............................. G05D 1/08; B64C 5/10; B64C 9/00
[52] U.S. Cl. .................. 244/90 A; 244/90 B; 244/53 B; 244/194; 244/195
[58] Field of Search ................................ 294/53 B, 194, 294/195, 230, 90 A, 90 B

[56] References Cited

U.S. PATENT DOCUMENTS

| | | |
|---|---|---|
| 2,821,352 | 1/1958 | Phillips . |
| 3,770,228 | 11/1973 | Traksel et al. .......................... 244/53 B |
| 4,363,098 | 12/1982 | Buus et al. ............................... 244/175 |
| 4,523,603 | 6/1985 | Peikert ..................................... 244/53 B |
| 4,649,484 | 3/1987 | Herzog et al. ........................... 244/230 |
| 4,744,532 | 5/1988 | Ziegler et al. .......................... 244/75 R |
| 4,865,268 | 9/1989 | Tracksdorf ............................... 244/53 B |
| 4,964,599 | 10/1990 | Farineau ................................... 244/195 |
| 5,135,186 | 8/1992 | Ako .......................................... 244/90 R |
| 5,458,304 | 10/1995 | Gilbert ..................................... 244/90 R |

*Primary Examiner*—Gregory L. Huson
*Assistant Examiner*—Virna Lissi Mojica

[57] ABSTRACT

Arcs of segmented spoilers generate a ring on intake airfoil surface of cantilever-suspended jet engines. Strain and temperature sensors on sides of a cantilever connecting structure feed data to a stress-limiting computer whose output communicates with actuator motors of spoiler segments. This stress-feedback network selects and actuates segmented spoiler surfaces to release radial forces that normally are balanced within the engine intake zone. The stress-limiting computer also takes autopilot data of anticipated attitude change patterns and forecasts anticipated strain patterns of an aircraft. An output communication is integrated with an electric power conditioning that actuates motors to position the segmented spoiler barriers.

14 Claims, 3 Drawing Sheets

5,588,620

RADIAL-FORCE SPOILER SYSTEM

CROSS REFERENCE TO RELATED APPLICATIONS

Ser. No. 935,284

Continuation-in-part (CIP) application of Ser. No. 935,284, now U.S. Pat. No. 5,445,346, "Segmented Spoilers", Filed 26 Aug. 1992 & of Ser. No 08/158,749, filed 26 Nov. 1993 and now U.S. Pat. No. 5,458,304, Disk Spoiler System (Claims 10–17 canceled)

Statement as to rights to invention make under Federally-sponsored research and development. Not applicable.

BACKGROUND OF THE INVENTION

The field of this invention is aircraft stress reduction using an interactive combination of strain sensors, amplifiers, computers, motor position controllers and segmented spoilers.

PRIOR ART

The working life of aircraft structures is limited in part by their cumulative stress cycles on structural members. Early unexplained in-flight failures of the British Airline "Comet" became attributed to vibration profiles of a new type internal jet engine for this new type jet aircraft that flew faster than any prior commercial type aircraft.

More recent news reported that a top surface panel came off an Aloha Airline 737 airplane while in flight. The metal fatigue was attributed to the age of the airplane and its humid, salty environment for corrosion.

The stress patterns for holding an engine to an airplane are particularly complex, for the rotating mass within an aircraft engine adds a gyroscopic component to engine's concentrated mass and its vectors of propelling force. In May 1979 an engine fell off an American Airlines DC 10 immediately after rotating for take off at Chicago. In December 1991 a China Airlines 747 dropped an engine from an air freighter at Taiwan; then in Oct 1992 an El Al cargo jet dropped an engine near the Amsterdam airport and an Evergreen 747 freighter dropped an engine near Anchorage in March 1993.

Lockheed electronics company has developed an On-board Structural Computer (OBSC) system. It consists of an on-board computer processor that collects and processes data from strain gages and from the aircraft's existing airspeed, altitude and vertical acceleration transducers. The strain gages measure stress on the wings and fuselage. Ref: Aircraft Engineering Journal, Vol 61, No 6 1989, V23N3 and citation 22, "Aircraft stress", structural fatigue monitored by Lockheed system -90-03 2158573 90 04446 from the Information Services in Mechanical Engineering Database.

Karman and others identified the character and forces of fluid-induced oscillations of round shapes as an aberration of laminar flow.

The Bernoulli brothers defined a normal "lift" force from changes in velocity of fluid, providing a surprising introduction to modern flight.

The continued high energy of audible noise levels from aircraft unusefully deliver unused forces in aircraft systems that consume fuel, generate noise, and induce fatigue of materials (and customers.)

Prior art processes for resolving stress-driven damage to structural aircraft components has been to instrument new aircraft and their structural components, using strain gages and associated recording instrumentation for data reduction. The data are then analyzed to forecast the anticipated safe life of the most critical structural elements. Regular inspections track conformity of surface indicators to forecasts.

When materials reveal excessive fatigue or corrossion, the affected components are redesigned and replaced during regularly scheduled overhauls.

In June 1993 the Boeing Company announced a major wing modification to prevent engines of the 747 from falling off the plane while it is in flight. The changes are scheduled to take 4 to 5 years to implement on the 948 worldwide 747 fleet.

Strain-gage technology is moving from research and engineering into on-board structural life assessment. Transducers in "rosette" patterns and strain-pattern processors reduce multiple strain to describe their net vectored amplitude and direction. Other than for cumulative stress record, production aircraft seldom include permanently installed strain gages on fuselage and wings.

Ser. No. 935,284 and its CIP application, "Segmented Spoilers" bring a modification to old technology for aircraft spoiler design. Segmented spoilers can be located as arcs of a ring around the inner airfoil surfaces at the front of the engine structure.

As segmented barrier surfaces are extended into the inside surface of an engine's air intake, a rapid-reaction collapse of Bernoulli pressure drop on a segment of the engine's circular inlet airfoil and diffuser-compression section with a resultant unbalance of radial forces.

There is an economic problem with a conventional improvement cycle of: (1) recording stress patterns, (2) forecasting component life, (3) inspecting against forecasted parameters, and (4) redesigning and repairing. The immediate economic problem is that each modification loop tends to add weight (and reduce user revenue). The continued economic problem is that redesign and repair tends to redistributes a greater total structural weight, thus exascerbating further the magnitude of material stresses and cumulative fatigue damage.

SUMMARY OF THE INVENTION

Segmented spoilers are located around the inner intake ring of a modern jet engine to offer a new means of radial force management for the aircraft. Fast-reacting electric motors drive segmented-spoiler surfaces of small mass to kill the Bernoulli "lift" effect available but unused from the airfoil ring around the mouth of jet engines. Motor-shafts that drive spoiler surfaces are positioned by motor-position controllers having instruction from a stress-limiting computer.

Stress-limiting computers draw data from autopilot circuits and strain transducers. Autopilot data describes anticipated change in airplane attitude, Strain transducer describes instant stress pattern data from engine mount locations.

The computer integrates data from multiple sources to prescribe extension patterns of segmented spoiler-barriers to generate instant radial forces that reduce unnecessary stress patterns within the engine-connecting and other aircraft structure.

The invention selects and uses available, unused radial forces from Bernoulli velocity change to offset flight stresses from change in attitude and elastic oscillation.

DESCRIPTION OF THE PREFERRED EMBODIMENTS

Figure 2:
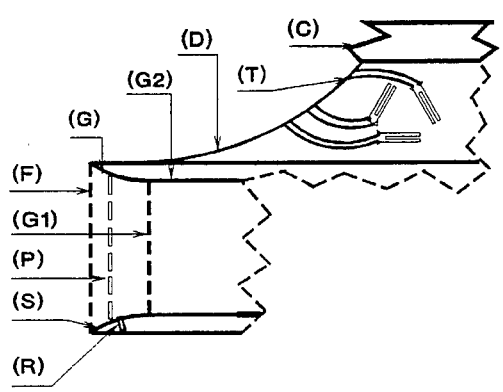
FIG. 2 is a side cut-away view of a Jet engine attached to a cantilever extension from a wing.
Figure 3:
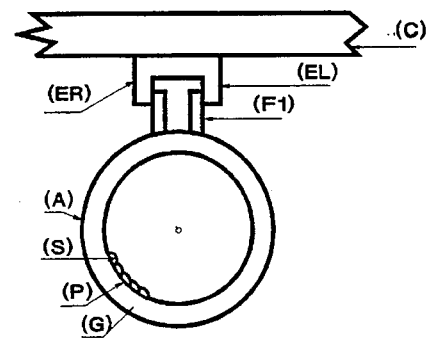
FIG. 3 is an front view of an engine suspended from a wing.
Figure 4:
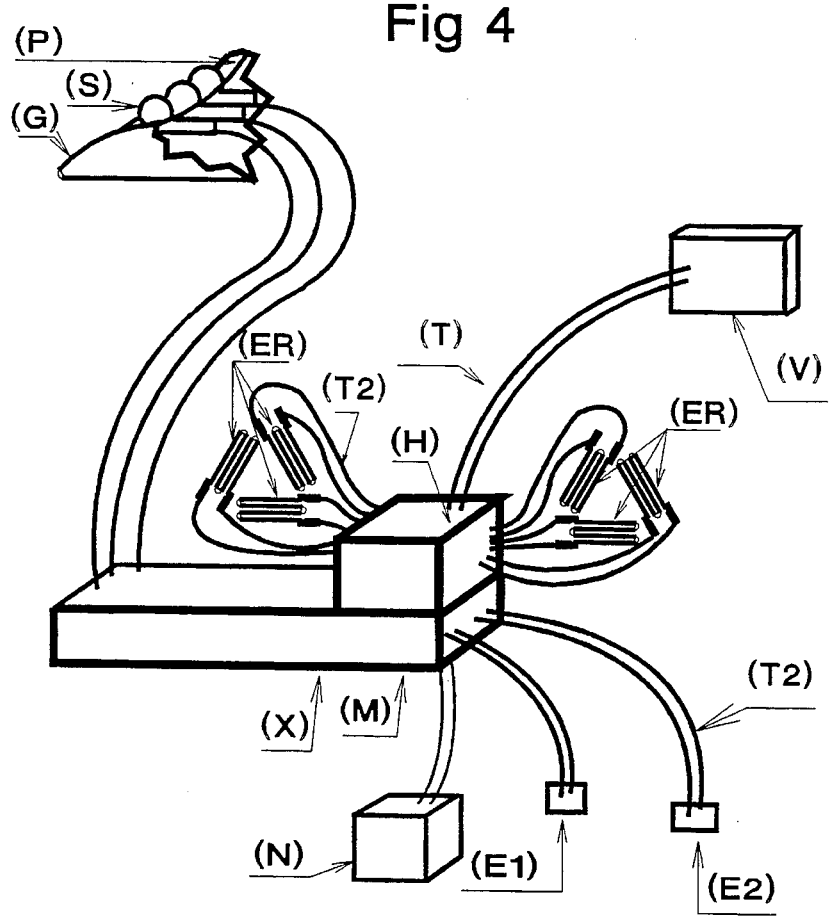
FIG. 4 is a diagram of strain sensors, computer-coupled with autopilot data to feed spoilers.

An aircraft structure (FIG. 1A) includes a cantilever extention (FIGS. 1D & 2D) on which an engine is attached. A set of fittings (FIG. 3F1) connect engine (FIG. 1F) attaching hardware (FIG. 1F1) to the cantilever extension of the aircraft structure. Sensors of strain (tranducers) (FIGS. 1EL, 1ER, 2EL, 3EL, 3ER, 4EL & 4ER) are affixed to left and right side of the engine-connecting structure.

Sensors of local temperature (FIGS. 1E1, 1E2, 4E1 & 4E2) are affixed near the transducers.

An autopilot (FIG. V) of the airplane systems is connected through leads (FIG. 1T) to commmunicate (FIG. 1T) with a strain-limiting computer (FIG. H).

Strain and thermal sensors communicate to the computer through leads (FIGS. 1T1, 1T2 2T1, 4T, 4T1 & 4T2).

Figure 1:
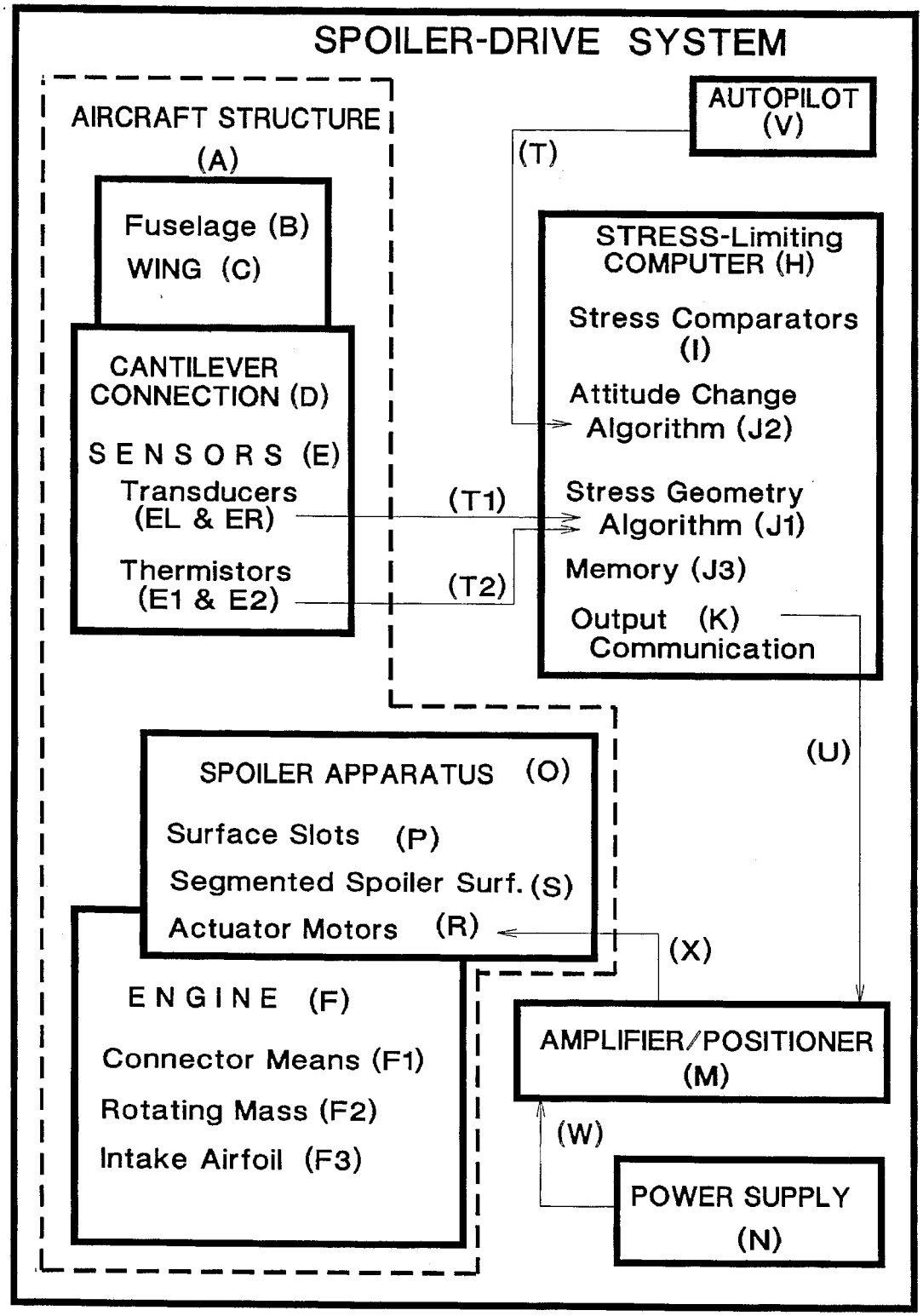
FIG. 1 is a chart of a spoiler-drive stress-limiting system.

The computer compares data from multiple strain gage positions (FIGS. 5-1, 2 & 3) for each side of engine-connecting structure, and calculates (FIG. 5-3) instant rate of change for sensed stress angles and amplitudes as input to a stress-geometry algorithm (FIG. 1J1). A memory (FIG. 1J3) accumulates fatigue stress experience and shifts in strain gage parameters.

Stress-driven elongation of structure beyond their elastic limit results in a permanent set of strain sensor standard dimension. Such set will be revealed in electronic parameters that are subject to standards calibration.

Figure 5:
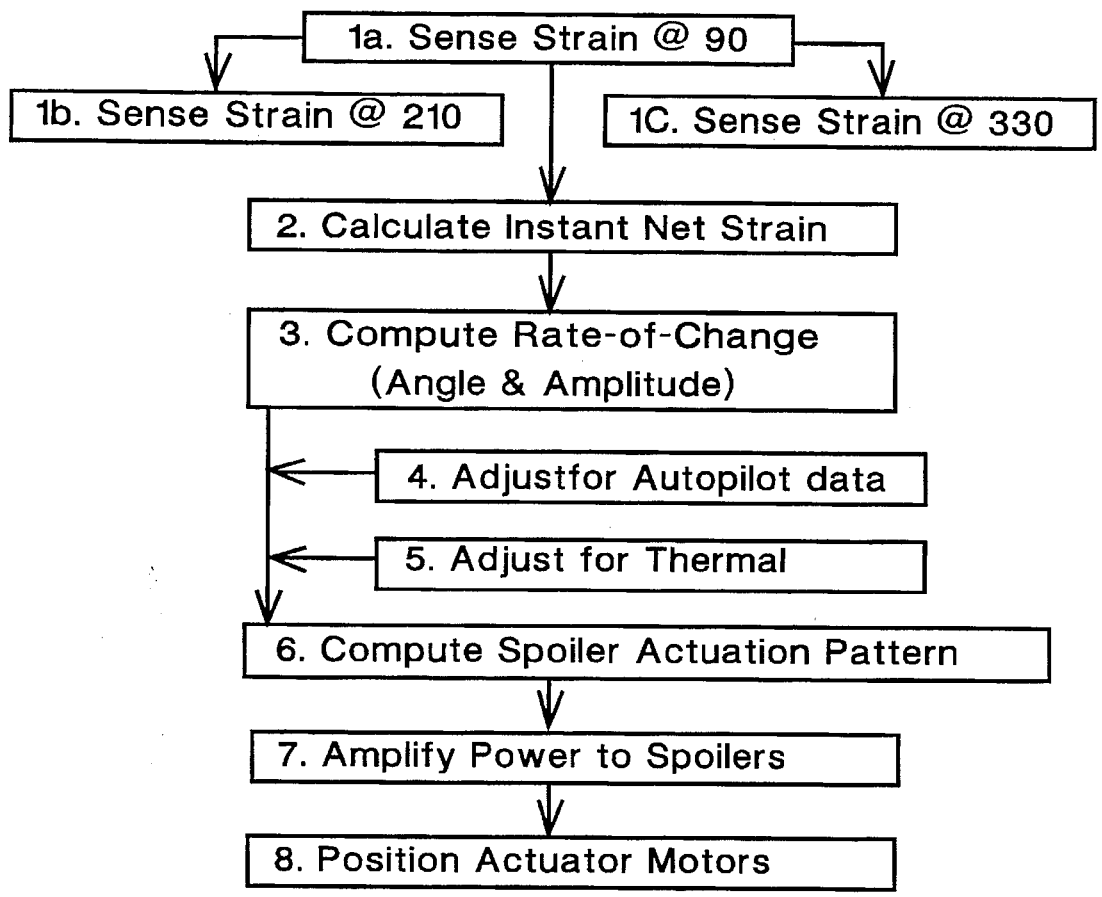
FIG. 5 is a block chart showing flow of data to actuate segmented spoilers.
Figure 6:
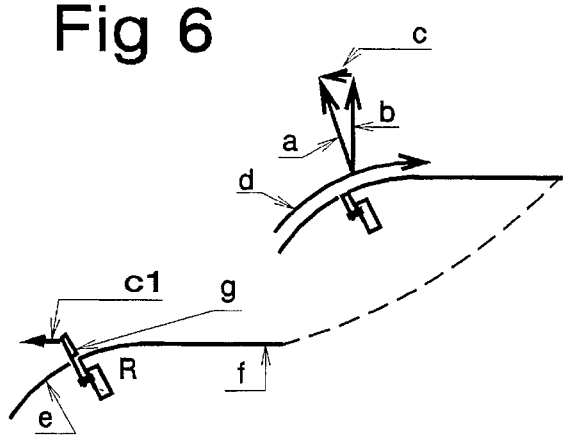
FIG. 6 is a diagram showing forces acting on an airfoil.

The autopilot's (FIG. 5-4) data are processed within an attitude-change algorithm (FIG. 1J2) to account for programmed attitude change commands. This data is combined with thermal sensor data (FIGS. 1E1, 1E2 & 5-5), and the stress-geometry algorithm's adjusted instant stress patterns to compute a spoiler actuation pattern (FIG. 5-6).

An aircraft power supply (FIG. 1N) communicates through wires (FIG. 1W) to an amplifier/positioner (FIG. 1M) wherein output means (FIG. 1K) of the computer (FIG. H) communicates spoiler position data for actuator motor is (FIGS. IR & 5-6) of each engine's segmented spoilers (FIGS. 1S, 3S & 4S). Amplifying and phase-management circuits (FIG. 5-7) transmit through individual motor conductors (FIG. 1X) to actuator motors (FIG. 1R) which position segmented spoiler surfaces (FIGS. 1S, 3S & 4S).

Extension of spoiler surfaces (FIGS. 1S, 3S & 6S) through surface slots (FIGS. 1P & 2P & 6P) of the engine's circular entry airfoil (FIGS. 1F3, 2G, 3G & 6G) spoils the Bernoulli effect (FIG. 6a) on a laminar flow (FIG. 6d).

e.g. Where laminar flow accelerates a mass of air over an airfoil, a resistant force (FIG. 6c) is paired with a radial force (FIG. 6b) from pressure drop over airfoil surfaces (FIGS. 6e & f). Interruption of laminar flow by a barrier segment (FIG. 6g) kills the radial force, leaving only a resistant force (FIG. 6c1). Segmented barrier surfaces, as from a rotated disk, that interrupt a portion of mutually balanced radial inward force from the airfoil ring release controllable radial forces at the front of the engine.

I claim:

1. In an aircraft comprised of a fuselage, wing, engine, autopilot and electric power supply, a stress reduction apparatus further comprising:

segmented spoiler apparatus, mounted at the front of the engine, sensor means, and stress-limiting computer means;

wherein segmented spoiler means are located in concave arcs along a line parallel to an air entry mouth of the jet engine, and wherein sensor means generate data that is processed by the stress-limiting computer means to actuate segmented spoilers with amplitude and timing sufficient to minimize accumulated stress within aircraft structures.

2. Apparatus of claim 1, wherein sensor means are comprised of strain-gage sensors, mounted on side surfaces of cantilever connections between the aircraft airframe and the engine.

3. Apparatus of claim 2 wherein the strain-gage sensors further comprise:

a strain transducer, and a stress/strain comparator wherein the strain transducer is affixed at two points to an aircraft surface; and an electrical apparatus connects the transducer and the comparator, and wherein the comparator circuits convert linear motion (strain) into parameters of electronic data.

4. Apparatus of claim 3 wherein multiple strain transducers are geometrically oriented on the stressed surface areas; and wherein comparator circuits and logic circuits calculate the instant resultant stress forces that are being applied within a structural member.

5. Apparatus of claim 4, further comprising:

a stress geometry algorithm of the computer, wherein stresses sensed by multiple strain sensor systems are calculated to define magnitude and vector angle of instant structural stress levels at critical areas of the aircraft, and wherein the computer algorithm defines spoiler actuation patterns to reduce instant aircraft structural stress.

6. Apparatus of claim 5, further comprising:

a power amplifier/position controller and the power supply;

wherein a power supply sufficient to actuate spoiler motors is conditioned by time and torque force to rotate motor output shafts in response to data-instruction.

7. Apparatus of claim 2, further comprising:

thermal sensors, wherein thermal sensors are mounted in the proximity of the strain sensors, and electronic parameters contributed by the thermal sensors are communicated to computer means.

8. Apparatus of claim 5, further comprising:

projective logic algorithms;

wherein strain data patterns of accelerating and decelerating forces are computer-analyzed, and anticipation schedules provide data patterns to null unnecessary structural oscillations.

9. Apparatus of claim 8 wherein the data pattern to null unnecessary structural oscillations overrides data patterns to reduce instant stress, and oscillation override patterns are communicated to a motor-positioner apparatus.

10. Apparatus of claim 1, further comprising:

an attitude change algorithm, wherein the autopilot communicates data describing attitude change commands into an attitude change algorithm of the stress-limiting computer means.

11. Apparatus of claim 10, further comprising:

projective logic algorithms;

wherein aircraft attitude changes are patterned to forecast a sequence of changes in attitude and acceleration that induce stress on structural members.

12. Apparatus of claim 11, further comprising stress comparators;

wherein the change-in-attitude projective data are combined with projective oscillation nulling data to compute instant spoiler pattern for each engine.

13. Apparatus of claim 5, further comprising a memory, wherein strain parameters that reveal a permanent set in strain sensors are recorded to provide criteria for repair or overhaul of aircraft structure.

14. Apparatus of claim 13 wherein cumulative stress profiles are recorded to forecast remaining working life of cantilever structures and strain-measured fittings before overhaul.

* * * * *